United States Patent
Beer et al.

[11] 3,813,556
[45] May 28, 1974

[54] TILT LIMIT DETECTING APPARATUS

[75] Inventors: Emanuel E. Beer, Eastchester; Eric H. Jeltrup, Ossining, both of N.Y.

[73] Assignee: The Singer Company, Little Falls, N.J.

[22] Filed: Apr. 27, 1972

[21] Appl. No.: 248,131

[52] U.S. Cl. ............... 250/575, 250/577, 250/231
[51] Int. Cl. ...................... G01d 5/34, G01n 21/26
[58] Field of Search ........... 250/231, 218, 575, 577; 33/366

[56] References Cited
UNITED STATES PATENTS
2,427,902   9/1947   Clifton et al. .................. 250/231 R Primary Examiner—James W. Lawrence
Assistant Examiner—T. N. Grigsby
Attorney, Agent, or Firm—T. W. Kennedy

[57] ABSTRACT

A tilt limit detecting device which utilizes a bubble level containing a prescribed amount of opaque fluid and a photodector arrangement transverse to the longitudinal axis of the bubble level. The photodector arrangement includes a pair of light source-photocell combinations the first of which is normally positioned at the center of the bubble in the level position while the second combination is spaced a distance Y from the first, such that the distance Y is less than the bubble length X. The opaque fluid acts as a shutter interposed between the light source-photocell combinations, so that with the connection of suitable electronic circuitry to the photocells angular tilts in excess of the allowable limit, which generally equals X/2 in radians, are detected as well as the particular direction, clockwise or counter clockwise, identified.

13 Claims, 7 Drawing Figures

PATENTED MAY 28 1974 3,813,556

TILT LIMIT DETECTING APPARATUS

BACKGROUND OF THE INVENTION

1. Field of Invention

This invention relates to a device for detecting deviations from a fixed position and particularly to a device wherein a bubble level in conjunction with a light detection system is used to detect predetermined angular deviations.

2. Description of the Prior Art

In many situations it is required to establish a particular reference position and to determine when deviations from the reference position exceed a predetermined amount. One such situtation arises in aircraft landing systems wherein a ground-based radio beam is transmitted at a prescribed angle with the horizontal to thereby provide a guidance path for interrogating aircraft. Aircraft at long distances from the airport rely on this transmitted beam to give them the proper guidance in their approach to the airport particularly when visibility is poor or non-existent as at night or in inclement weather. It becomes important, therefore, to insure that the transmitter beam remains positioned within a predetermined tolerance band. If the center line of the transmitted beam were to drift outside this tolerance band the corresponding movement of the beam at greater distances from the airport would be excessive to the point that the aircraft would have to fly dangerously low or high in order to track the transmitted beam. Thus, a need for a device to sense when the transmitted beam is without the accepted tolerance band and to provide an appropriate warning thereof is obviously apparent. Prior art approaches have included mercury filled switches wherein a globule of mercury electrically shorts one of two pairs of wires, depending on whether the level is being subjected to a clockwise (cw) or counter clockwise (ccw) displacement. Each pair of wires is positioned a distance from the center of the level proportional to the acceptable angular tilt. One problem with this type of tilt detector is its sensitivity to temperature extremes. For example, at −55° centigrade the mercury globule approaches a frozen condition whereby the switch is made completely inoperative or at best, responds with a decreased sensitivity to angular tilts. This would present obvious problems when the landing system is used in colder climates.

In U.S. Pat. No. 2,427,902 issued to J. C. Clifton et al there is suggested a technique similar to the present invention in that it provides for the interruption of the light path between a light source and a photocell by the interposition of an opaque fluid in a bubble level. It further describes in a limited fashion how two photocells may be used to detect excessive angular deviations in either direction. However, unlike the present invention, the photocells in the Clifton patent are spaced symmetrically about center gravity position and both must be located accurately relative to center gravity position in order to give identical indications for clockwise or counter clockwise deviations. Other distinctions will become apparent as the specific embodiments of the present invention are described.

SUMMARY OF THE INVENTION

The present invention is a tilt detecting system which includes a bubble tube, containing an opaque fluid and air bubble of predetermined dimension based on the required system sensitivity and repeatability. The system further includes a pair of light sources and light detecting semiconductor devices placed on either side of the tube to thereby form two light paths transverse to the longitudinal axis of the tube wherein the distance between the light paths formed is less than the longitudinal width of the air bubble. In a level condition one light path intersects the center of the air bubble with the second path, typically, interrupted by the opaque fluid. As the apparatus to which the detecting system is affixed is moved from its nominal position the bubble is displaced relative to the two light paths. Depending on the direction, when the movement exceeds the allowable deviation either the second light path will become uninterrupted and the first light path interrupted or the first light path will become interrupted in addition to the already interrupted second light path. Light detecting semiconductor devices are configured in a circuit arrangement in such a fashion that when the movement in either the cw or ccw exceeds the allowable deviation a corresponding indicator is actuated.

It is therefore an object of this invention to provide a tilt detecting device which utilizes the interruption of one or more of a pair of light paths to indicate when the allowable tilt is exceeded.

A further object of the invention to provide a detecting device which is operable at colder temperatures.

Another object of the invention is to provide a detecting device which can sense when the allowable tilt is exceeded by either cw or ccw motion and give a corresponding indication.

Still another object of the invention is to use a bubble level as a basic level sensing device where the fluid contained therein is opaque and acts to interrupt the light paths in a predictable fashion based on the amount and direction of angular deviation from level.

It is still another object of the invention to provide a detecting device which, having exceeded the allowable deviation limits and having provided a corresponding indication thereof, will continue to provide said indication through angular deviations of greater than 90°.

DESCRIPTION OF THE DRAWINGS

Reference is now made to the accompanying drawings for a better understanding of the nature and objects of the detecting device. The drawings illustrate the best mode presently contemplated for carrying out the objects of the invention and its principles and are not to be construed as restrictions or limitations on its scope. In the drawings:

Referring now to FIG. 1 there is shown an angular tilt limit detecting device 10, which comprises a holding fixture 11 which in turn houses bubble level 12. The bubble level 12 includes a vial 14 of transparent material such as glass, partially filled by an opaque fluid 16. The fact that the vial 14 is only partially filled with the fluid 16 results in the formation of a bubble 18. The vial 14 is arcuately shaped having a radius of curvature R, sufficient to satisy the particular angular sensitivity and repeatability requirements of a given system. The vial is mounted securely to the holding fixture 10 by any known means and in such a fashion that the bubble 18 is centered between the ends of the vial when the mounting surface 19, of holding fixture 10 is level with the horizontal. The vial is filled with a sufficient quantity of fluid 16 to allow for a bubble 18 of width X. In accordance with well known mathematical relationships the bubble width X equals $R\alpha$ for large values of R and small values of $\alpha$ where $\alpha$ is equal to twice the allowable system angular deviation from center gravity or level position.

FIG. 2 represents a version of the tilt limit detecting device wherein movment in either direction cw or ccw, in excess of the allowable deviation $\alpha/2$ is detected and indicated on but one indicating device. The holding fixture 11 contains a pair of apertures 22 and 24, the center line 25 of said pair of apertures being transverse to the longitudinal axis 20 of bubble level 12. Located within aperture 22 is a light source 26 having filament leads 28 and 30. A condensing lens 32 may be interposed between the light source 26 and the bubble level 12 to increase the light intensity along the center line 25 of said aperture pair. Located within aperture 24 is a light sensitive device 34 which may preferably be a Cadmium Sulphide photoresistor, whcih exhibits two operational states depending on whether or not light impinges on the surface 36 of the light sensitive material. The center line of the light sensitive device and the light source are nominally coaxial with the center line 25 of the aperture pair.

Figure 1:
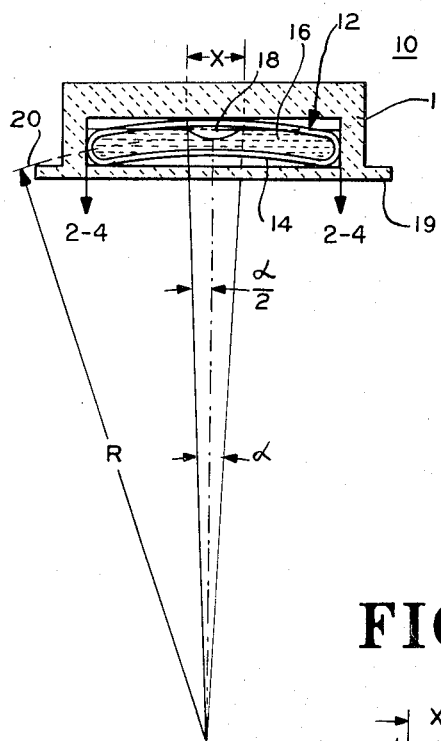
FIG. 1 is an elevation view of a bubble level configured in accordance with this invention.

When the tilt limit detecting device is leveled the light path emanating from light source 26 is constrained by the aperture 22 to form a path nominally coaxial with the center line 25, said path being transverse to the longitudinal axis 20 of the bubble level and bisecting the bubble 18 into two symmetrical halves. When the equipment, to which the detecting device 10 is affixed, is tilted in excess of the allowable angular deviation, the light path formed between the light source 26 and the light sensitive means 34 becomes interrupted by the interposition of the opaque fluid 16, the degree of opaqueness of the fluid 16 depending upon the photosensitive characteristics of the light sensitive device 34. Where for example, a Cadmium Sulphide photo resistor is used for the light sensitive device 34, since, typically the peak spectral response for such a photoresistor is on the order of 5,000 to 7,300 angstroms, the opaqueness is such as to minimize the transmission of the red portions of the light spectrum which occur in this wave length region. Additionally, if the detecting device is to be used over extreme temperature ranges, including operation at minus 60° C., the temperature expansion coefficient and the viscosity of the fluid must be such as to insure required sensitivity and repeatability at these extremes of temperature. One such fluid mixture which was found to satisfy the expansion coefficient and viscosity requirements as well as the necessary opaqueness consists of five parts of eythl ether, five parts of 3-menthyl pentane and two parts of ethyl alcohol with the addition of a sufficient quantity of black dye, such as Nigrosine B, to achieve the necessary opaqueness.

Figure 2:
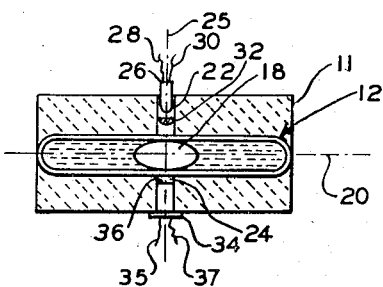
FIG. 2 is a partial sectional view of one embodiment of the invention taken along line 2—2 of FIG. 1.
Figure 3:
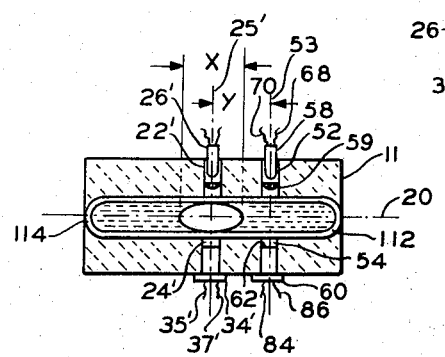
FIG. 3 is a schematic of a circuit used with the embodiment of FIG. 2.

FIG. 3 is a schematic representation of an electronic circuit used with the apparatus of FIG. 2 to give an indication of when the allowable angular deviation is exceeded. Filament lead 28 is connected to a voltage supply V whereas filament lead 30 is connected to a point of reference potential 38. A base current supply resistor 40 is connected between the voltage supply V and the base 42 of transistor 44. Indicating device 46, which may be a lamp or the coil of a relay wired to give an appropriate warning, is connected between supply V and the collector 48 of transistor 44. The emitter 50 of transistor 44 is connected to reference potential 38. Lead 35 of light sensitive device 34 is connected to the junction of resistor 40 and transistor base 42, while lead 37 of the light sensitive photoresistor 34 is connected to reference potential 38.

When the limit device of FIG. 2 is within the allowable angular deviation the light emanating from light source 26 passes through bubble 18 and impinges on the surface 36 of the photoresistor 34. This results in the resistance of the photoresistor being sufficiently low such that the voltage at the junction of base 42 and photoresistor lead 35, developed by the current $I_B$ passing through the photoresistor, is less than the voltage necessary to bias the base-emitter junction of transistor 44. Thus transistor 44 is biased off so that indicating device 46, connected between the collector 48 of transistor 44 and voltage supply V is not energized.

When the detecting device is tilted in excess of the allowable deviation, so that the light path is interrupted by the interposition of the opaque fluid 16, the resistance of light sensitive device 34 increases so that the voltage at the junction of the base 42 and the photoresistor lead 35 is now sufficient to bias the base-emitter junction on. The value of resistor 40 is such that the base drive current $I_B$, virtually all of which enters the base 42, is sufficiently large to drive transistor 44 into saturation. In so doing the collector 48 drops to a voltage very close in potential to the reference potential 38, thereby energizing the indicating device 46.

Figure 4:
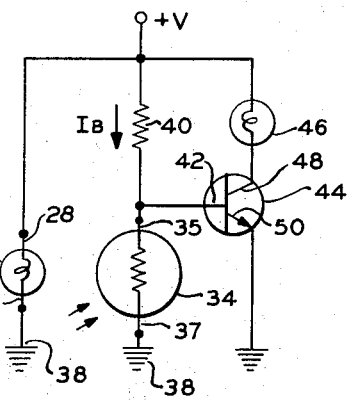
FIG. 4 is a partial sectional view of a second embodiment of the invention taken along line 4—4 of FIG. 1.

Referring now to FIG. 4, there is shown a bi-directional version of the tilt limit detecting switch. The device of FIG. 4 is identical to FIG. 2 except for the addition of a second pair of apertures 52 and 54. The center line 53, of this second pair of apertures is postioned in holding fixture 11 at a distance Y from the center line 25' of the first pair of apertures formed by apertures 22', 24'. This second pair of apertures may be positioned on either side of the first pair but for illustration purposes the operation of the device of FIG. 4 will be explained with the second pair positioned as indicated in FIG. 4. For reasons soon to be apparent the distance Y between the center lines of each pair must be less than the total bubble width, X. The second pair of apertures are positioned in a plane parallel to the mounting surface 19 of the holding fixture 11, such that when bubble 18 is displaced to the right, as one views the device in FIG. 4, the bubble will be interposed between each of the second pair of apertures. The first pair of apertures 22' and 24', again, are identical in function and position to the corresponding apertures in FIG. 2. Additionally, light source 26' and if needed, condensing lens 32', is located in aperture 22' and light sensitive means 34' is located within aperture 24'. Similarly, aperture 52 contains a second light source 58 and if needed, a condensing lens 59, and aperture 54 contains a second light sensitive device 60. Light source 58 will create a light path which will impinge on the front surface 62 of the light sensitive device 60 when the bubble 18 is interposed between the light source and light sensitive device. The light source 58 and the light sensitive device 60 are preferably identical in characteristics to light source 26' and light sensitive device 34'.

Figure 5:
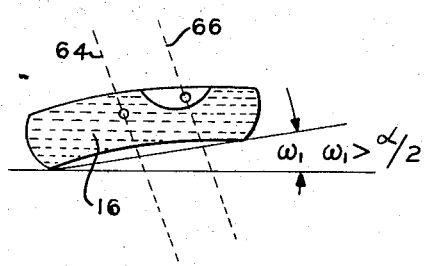
FIG. 5 is a perspective view used to illustrate one operational mode of the invention.

In discussing the bi-diretional embodiment of the subject invention reference will be made to FIGS. 4, 5, 6 and 7 interchangeably in order to facilitate the discussion. FIG. 5 represents a counterclockwise deviation of the detecting device 10, in an amount in excess of the allowable angular deviation $\alpha/2$. When the device 10 is tilted an mount $\omega_1$ which is greater than $\alpha/2$ the light path 64, generally coaxial with the center line of light source 26' and light sensitive device 34', is interrupted by the opaque fluid 16. Concurrently, the light emanating from the light source 58 passes through the bubble 18, such that it impinges on the front surface 62 of the light sensitive device 60.

Figure 7:
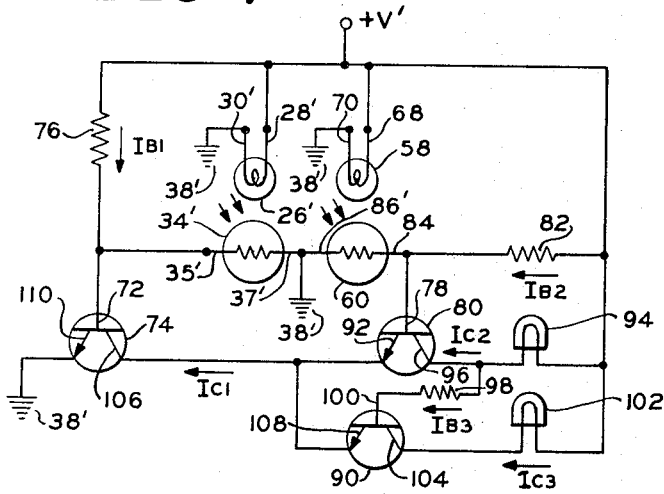
FIG. 7 is a schematic representation of the second embodiment of the invention.

Reference to FIG. 7 will explain the electronic circuit response to the condition depicted in FIG. 5. Light source 26' is connected to a voltage supply V' through lead 28', and is connected to a reference potential 38' through filamnet lead 30'. Similarly, lamp 58 is connected to voltage supply V' through filament lead 68 and is connected to reference potential 38' through filament lead 70. The base 72 of transistor 74 is connected to the voltage supply V' through a resistor 76 which is of a sufficiently low value to enable 74 to be driven into saturation when virtually all of the base drive current $I_{B1}$ is supplied to the base 72 as hereinafter described. The light sensitive means 34' is connected to the junction of resistor 76 and base 72 through lead 35' and is connected to reference potential 38' through lead 37'. The base 78 of transistor 80 is connected to the voltage supply V' through resistor 82. The value of resistor 82 is sufficiently low to provide enough base drive current $I_{B2}$, sufficient to drive transistor 80 into saturation as required. Light sensitive device 60 is connected to the junction of resistor 82 and base 78 of transistor 80 through lead 84 and is connected to reference potential 38' through lead 86.

When the condition depicted in FIG. 5 exists, the light path 64 is interrupted by the opaque fluid 16 and thus the light impinging on light sensitive device 34' is interrupted. When the light sensitive device 34' is a photoresistor, as depiected in FIG. 7, under the conditions of FIG. 5, the resistance of 34' between the terminals 35' and 37' increases in value so that the voltage at the junction of the base 72, photoresistor 34' and resistor 76 is sufficient to bias on the base-emitter junction of transistor 74. The collector current $I_{C1}$ for transistor 74 is supplied either through transistor 80 or transistor 90 depending on whether or not light sensitive device 60 is being illuminated by the light from light source 58.

Under the conditions depicted in FIG. 5, since the light from light source 58 is impinging on light sensitive device 60, the resistance of light sensitive device 60 is sufficiently low in comparison to the resistor 82 that the voltage at the junction of base 78, photoresistor 60 and resistor 82, developed by the current $I_{B2}$ passing through the photoresistor 60, is less than the voltage necessary to bias on the base-emitter junction of transistor 80. Therefore, the transistor 80 is non-conducting. Consequently, indicating device 94, which is connected between collector 96 and supply voltage V' is not energized.

Resistor 98 is connected on one end to the junction of collector 96 and by its other lead to the base 100 of transistor 90. Resistor 98 is low enough in value to provide a base drive current, $I_{B3}$, sufficient to drive transistor 90 into saturation when required. Additionally, resistor 98 is large enough in value to limit the base drive current $I_{B3}$ to a value insufficient to energize indicating device 94. For the situation depicted in FIG. 5 since transistor 80 is non-conducting, collector 96 is close in voltage potential to V' so that current $I_{B3}$ flows into the base 100 of transistor 90. Transistor 90 is thereby driven into saturation resulting in saturation current $I_{C3}$ flowing through indicating device 102, connected between V' and collector 104 of transistor 90, through transistor 90, and then into collector 106 of transistor 74, which is connected to emitter 108 of transistor 90, and finally to reference potential 38' which is connected to emitter 110 of transitor 74. $I_{C3}$ energizes indicating device 102 which will then give an indication corresponding to the counterclockwise deviation depicted in FIG. 5.

Figure 6:
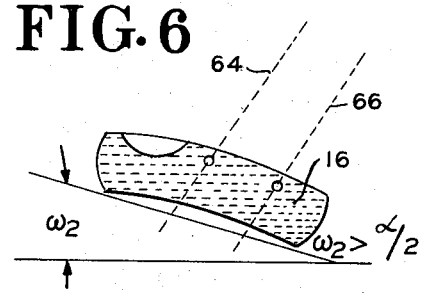
FIG. 6 is a perspective view used to illustrate a second operational mode of the invention.

Referring now to FIG. 6, we have a deviation, $\omega_2$ greater than the allowable angular deviation $\alpha/2$ but in a clockwise direction. Now both light paths 64 and 66 are interrupted by the opaque fluid 16 so that the light emanating from light sources 26' and 58 do not impinge upon light sensitive devices 34' and 60 respectively. Thus, where photoresistors are used as the light sensitive devices, the resistance between the terminal leads for each device is very much larger than it would be if the light were impinging upon the devices.

Referring again to FIG. 7, for the reasons stated hereinabove in connection with FIG. 5, transistor 74 is biased on. Now, in addition, transistor 80 is biased on. This is due to the fact that the resistance of photoresistor 60 is now sufficiently high so that the voltage developed at the junction of photoresistor terminal 84, base 78 and resistor 82 is sufficiently high to bias on transistor 80. This results in current $I_{B2}$ entering base 78 of transistor 80 and driving it into saturation. Current $I_{C2}$ flows through indicating device 94 and then through transistors 80 and 74. $I_{C2}$ energizes indicating device 94 which then gives an indication that the allowable angular tilt has been exceeded in the clockwise direction.

When transistor 80 is driven into saturation, the saturation voltage appearing between the collector 96 and the emitter 92 of transistor 80 is in the range of 0.1 to 0.2 volts. Again, base 100 of transistor 90 is connected to collector 96 through resistor 98 and emitter 108 of transistor 90 is connected to the emitter 92 of transistor 80. Thus the voltage across the base emitter junction of transistor 90, which effectively is the saturation voltage of transistor 80, is less than what is required to bias on transistor 90 so that no current flows through indicating device 102. Thus, the supporting electronics depicted in FIG. 7 will give an indication on indicating device 102 for the counterclockwise deviation depicted in FIG. 5.

When the system is within the angular deviation limits, essentially the condition depicted in FIG. 4, it is apparent that neither indicating device 94 or 102 can be activated. Whenever the device is within the angular deviation limits $\pm \alpha/2$, the light path 64 will always be uninterrupted so that light from lamp 26' will always impinge upon light sensitive device 34'. This results in the resistance seen between terminals 35' and 37' being sufficiently low such that the voltage at the junction of base 72, resistor 76 and lead 35', developed by the current $I_{B1}$ passing through the photoresistor 34', is less than the voltage necessary to bias on the base emitter junction of transistor 74. Consequently, with transistor 74 biased off, there is no way in which current $I_{C2}$ or $I_{C3}$ can flow since transistor 74 forms a necessary part of their respective circuit paths.

It is not only important that the detecting device described above detects when the instrument to which it is mounted initially exceeds the allowable angular deviation but it is also advantageous to maintain this indication for angular deviations far in excess of the allowable limits. This advantage is available in the subject invention by a suitable combination of vial length and quantity of fluid 16.

Referring to FIG. 4, if the amount of fluid contained within the vial is such that the volume of the bubble 18 is greater than the volume of a section of the vial formed between an imaginary plane intersecting the vial along centerline 53 of the second pair of apertures transverse to the longitudinal axis 20 and the right hand end of the vial 112 then, because of this relationship, light emanating from light source 58 will continue to impinge on light sensitive device 60 for angular deviatons $\omega_1$, as depicted in FIG. 5, greater than 90°. In fact it has been demonstrated that deviations up to 130° continue to give the appropriate warning. Similarly, by making the volume of the left hand section of the vial, formed between an imaginary plane intersecting the vial along the centerline 25' of the first pair of apertures transverse to the longitudinal axis 20 and the left hand end of the vial 114, greater than the volume of the bubble 18 then the light path 64 of FIG. 6 will continue to be interrupted for angular deviations $\omega_2$ far in excess of the allowable angular deviation.

The sensitivity of the device can be altered in numerous ways. For example the radius of curvature of the vial can be varied as required, the photoresistors selected can have a sharper response curve; or the light sources could be driven from separate voltages with each voltage adjusted to fine tune the sensitivity of each light source, light sensitive device, pair.

If the device is to be used to sense small angular deviations about an initial large angular tilt of, say 30°, the device could be affixed to a pre-leveling device which would be adjusted until the bubble 18 is centered in the vial. Then any deviations from this pre-level would be sensed in the manner described above.

Although the circuits described above utilized photoresistors for the light sensitive devices, it is readily apparent that with minor circuit changes phototransistors or light emitting diodes could be used in their place.

It can further be appreciated that other changes in the above embodiments can be made without departing from the scope of the present invention as defined in the appended claims.

What is claimed is:

1. A device for detecting angular movement which comprises:
    a bubble level partially filled by an opaque fluid such that the length X, of the bubble formed therein, along the longitudinal axis of said bubble level, bears a predetermined relationship to the amount of said angular movement;
    means for producing light transverse to said longitudinal axis; said light producing means including
    a holding fixture for supporting said bubble level;
    said holding fixture having a first pair of coaxially aligned apertures, disposed on opposite sides of said level such that the centerline of said pair of apertures is transverse to said longitudinal axis;
    a first light source located within one of said apertures such that the centerline of said light source is colinear with the centerline of said pair of apertures;
    a first voltage means for energizing said light source;
    and means for detecting if said opaque fluid interrupts the path formed by said light when said angular movement exceeds a specified amount.

2. The device of claim 1 wherein said detection means comprises:
    light sensitive means located within the second of said apertures, said light sensitive means responsive to the light emanating from said light source means; and
    electronic means connected in circuit to said light sensitive means for indicating whether or not said light is impinging on said light sensitive means.

3. The device of claim 2 where the bubble level is positioned in the holding fixture such that the centerline of said pair of apertures bisects said bubble when the device is in a level position.

4. The device of claim 3 where said opaque fluid is a mixture five parts of Ethyl Ether, five parts of 3-Methyl Pentane, two parts of Ethyl Alcohol and a predetermined amount of black dye Nigrosine B.

5. The device of claim 4 where said light producing means further includes a condensing lens interposed between said light source and said bubble level.

6. The device of claim 5 where said light sensitive means is a photoresistor.

7. The device of claim 1 wherein said light producing means further comprises:
    a second pair of coaxially aligned apertures disposed on opposite sides of said level and displaced along the longitudinal axis of said level at a distance Y from said first pair where the distance Y is less than the bubble length X, the centerlines of each pair being transverse to said longitudinal axis;
    a second light source located within one of said second pair of apertures; and
    second voltage means for energizing said second light source.
    a second light source located within one of said second pair of apertures; and
    second voltage means for energizing said second light source.

8. The device of claim 7 wherein said detection means comprises:
    first and second light sensitive means located within the remaining ones of each of said pair of apertures,
    said light sensitive means responsive respectively to the light emanating from said first and second light sources; and
    electronic means connected in circuit to said first and second light sensitive means for indicating whether or not the light emanating from said light sources impinges on said first and second light sensitive means.

9. The device of claim 8 where the bubble level is positioned in the holding fixture such that the centerline of said first pair of apertures bisects said bubble when the device is in a level position.

10. The device of claim 9 where said opaque fluid is a mixture of five parts of Ethyl Ether, five parts of 3-Methyl Pentane, two parts of Ethyl Alcohol and a predetermined amount of black dye Nigrosine B.

11. The device of claim 10 where said light producing means further includes a first and second condensing lens interposed between said first and second light sources and said bubble level.

12. The device of claim 11 where said first and second light sensitive means are photoresistors.

13. The device of claim 12 where said bubble level includes a vial having a predetermined length and a predetermined amount of said opaque fluid such that the volume formed between an imaginary plane passed through the centerline of said second pair, transverse to the longitudinal axis of the vial and the end of the vial nearer the centerline of said second pair is less than the volume of said bubble.

* * * * *